LOGICAL CIRCUITS

Filed Aug. 2, 1962 2 Sheets-Sheet 1

Inventor:
J.M. Chilton.
By
Hugh A. Kirk
Attorney

Inventor:
J. M. Chilton.
By Hugh A. Kirk
Attorney 3,229,117
LOGICAL CIRCUITS
John Moorhouse Chilton, Harborne, Birmingham, England, assignor to W. & T. Avery Limited, Birmingham, England, a British company
Filed Aug. 2, 1962, Ser. No. 214,372
Claims priority, application Great Britain, Aug. 19, 1961, 29,991/61
4 Claims. (Cl. 307—88.5)

This invention relates to logical circuits and more particularly to a half adder of the type composed of electrical circuits having two input terminals and one or more output terminals with the signal condition being determined by one or the other of two steady voltages, e.g. a zero voltage and a negative voltage.

In practice the two dissimilar signal conditions usually take the form of a negative voltage and zero voltage and in standard binary notation are denoted "1" and "0" conditions respectively. Adopting this notation the half adder circuit is defined as providing a 1 condition at its first output terminal, commonly referred to as a "summing signal" at its "summing" terminal, and a 0 condition at its second output terminal, commonly referred to as the "carry" terminal, with either 0 and 1 or 1 and 0 conditions present at its two input terminals, providing an 0 condition at the "summing" output terminal and a 1 condition, commonly referred to as a "carry signal," at its "carry" output terminal with 1 conditions present at both of its input terminals, and providing 0 conditions at both of its output terminals with 0 conditions present at both of its input terminals.

The present invention has for its object a particularly simple and reliable half adder circuit which can be readily constructed from commercially available circuit elements.

It has become standard practice for those concerned with the design of logical circuits to refer to certain types of circuits by their function in recognising the relationship between two input signals applied to the circuit. Three examples of such circuits are known as "AND," "NOR" and "EXCLUSIVE OR" circuits, their functions respectively being to provide a 1 condition at an output terminal only when a 1 condition is present at all input terminals of the "AND" circuit, to provide a 1 condition at an output terminal only when 0 conditions are present at all input terminals of the "NOR" circuit, and to provide a 1 condition at an output terminal only when a 1 condition is present at one input terminal and a 0 condition at another input terminal of the "EXCLUSIVE OR" circuit.

A further object resides in providing a half adder circuit comprising an "AND" and a first "NOR" circuit having two input terminals connected in parallel, a second "NOR" circuit having two input terminals connected one to the output terminal of the "AND" circuit and the other to the output terminal of the first "NOR" circuit, and a third "NOR" circuit having its two input terminals connected to the two ouput terminals of the first and second "NOR" circuits, the output terminals of the second and third "NOR" circuits constituting "sum" and "carry" output terminals of the half adder circuit.

Yet another object is to provide a binary number adding stage comprising a pair of half adder circuits wherein the first and second input terminals of the first half adder circuit receive signals representative of two binary numbers to be added, the sum output terminal of the first half adder is connected to one input terminal of the second half adder, the second input of the second half adder is connected to receive any "carry" signal from a lower order adding stage, the two "carry" output terminals of the pair of half adder circuits are interconnected to provide any "carry" signal for any higher order stage, and the "sum" output terminal of the second half adder circuit provides any "sum" signal for the first mentioned stage.

A still further object resides in a modification of the above defined binary number adding stage wherein the third "NOR" circuit of each half adder circuit is omitted and an "EXCLUSIVE OR" circuit has its two input terminals connected to respective output terminals of the two "AND" circuits so that the output terminal of the "EXCLUSIVE OR" circuit provides any "carry" signal for any higher order stage.

One example of the practical application of the invention utilising semi-conductor elements is described with reference to the accompanying drawings, wherein.

Figure 1:
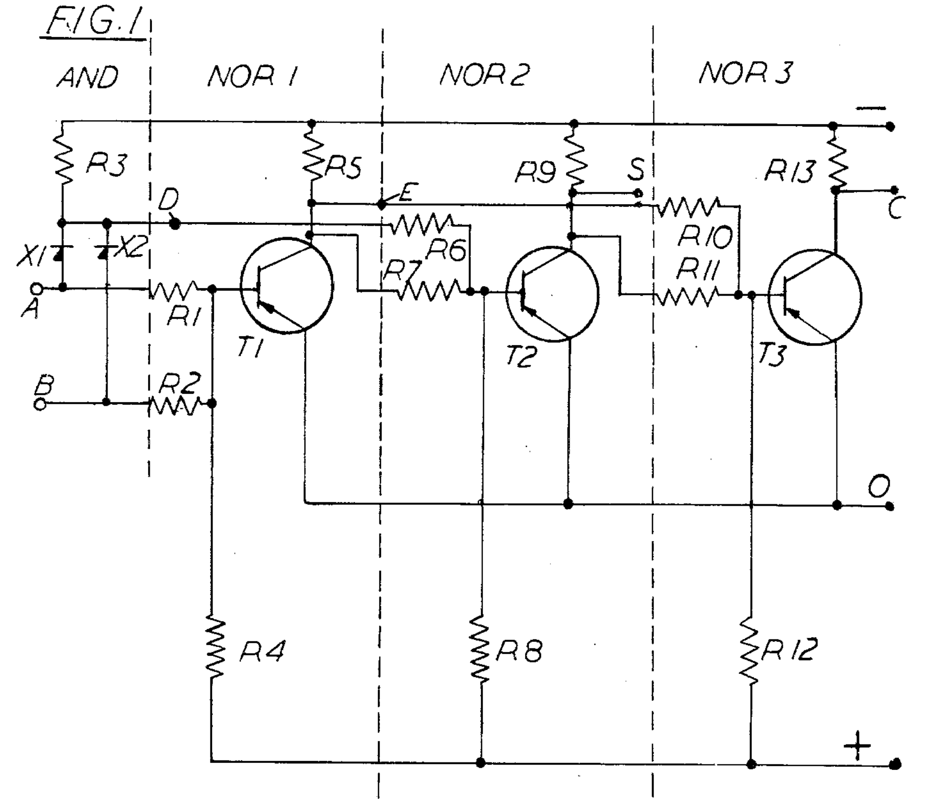
FIGURE 1 shows one example of a half adder circuit according to the invention.

Referring initially to FIGURE 1 it will be seen that the composite circuit is a combination of four circuits of two known types. The first circuit formed by diodes X1 and X2, and resistor R3 is known as an AND circuit since the output voltage at point D is negative only when the input voltages at both of the input terminals A and B is negative, hereinafter called the 1 condition, only when the input voltages at both of the input terminals A and B are 1, otherwise diode(s) X1 and/or X2 conduct(s) and hold(s) point D at zero voltage. The other circuits consisting firstly of transistor T1 and resistors R1, R2, R4 and R5; secondly of transistor T2 and resistors R6, R7, R8 and R9; and thirdly of transistor T3 and resistors R10, R11, R12, and R13; each forms what is known as a NOR circuit in which the output terminal, for example at point E in the first NOR circuit, is 1 only when the input voltage at neither of the input terminals A nor B is 1, otherwise the current flowing in the emitter/base circuit of the transistor causes an amplified current to flow in the collector circuit, holding the output terminal at zero voltage, hereinafter called the 0 condition.

Considering the application to the input terminals A and B of either of two alternative 1 and 0 conditions, the operation of the complete circuit of FIG. 1 is as follows:

If the signal at both the input terminals A and B is 0, transistor T1 is non-conducting and the voltage at E causes T2 and T3 to conduct so that the output voltage at both of terminals S and C is zero i.e. 0 condition.

If one input signal at A or B is 0 and the other is a negative voltage, 1 condition, then T1 conducts and E is at zero voltage, and since point D is also at zero voltage, T2 is cut-off and the signal at terminal S is 1 condition; since T2 is non-conducting terminal C is at 0 condition because its input resistor R11 is joined to terminal S.

If both input signals at A and B represent a 1 condition, point D is negative, both T1 and T2 are conducting and terminal S is at zero voltage, both inputs to T3 are now substantially zero and T3 is cut-off giving a 1 condition at terminal C.

To summarise, only when dissimilar signals obtain at the input terminals A and B does the output terminal S of the EXCLUSIVE OR circuit comprising the AND and the the first and second NOR circuits furnish a 1 condition, hereinafter referred to as a "summing" signal, of substantially the same voltage magnitude as that at terminal A or B, whereas at the same time the output terminal C of the half adding circuit consisting of the EXCLUSIVE OR together with the third NOR circuit furnishes the 0 condition. On the other hand with 1 condition at the input terminals A and B then terminal S furnishes a 0 condition voltage whereas terminal C furnishes a 1 condition hereinafter referred to as a "carry" signal.

It may be observed that the voltage at point D behaves generally in a similar manner to the output voltages at C. However, the former cannot conveniently be directly made the point for the "carry" signal with the third NOR circuit omitted because the impedance levels are not suitable for the inter-connection of several such composite circuits to form an adding system, and since in several stages cascaded together a progressive loss in "carry" voltage appears due to the voltage drop across diodes X1 and X2. However, if only an EXCLUSIVE OR is required, to give a 1 condition output signal with dissimilar input signal conditions, then the "carry" output at C is not used and the transistor T3 and resistors R10, R11, R12 and R13 forming the third NOR circuit may be omitted.

The above described circuit has the advantage of using relatively few components, is extremely tolerant of variation in component values and supply voltages, and may be cascaded indefinitely without impedance matching devices or voltage level adjustment. Furthermore, since in the complete circuit there are always two transistors conducting, the current taken from the supply lines is substantially constant, which simplifies the design requirements of a power supply.

Figure 2:
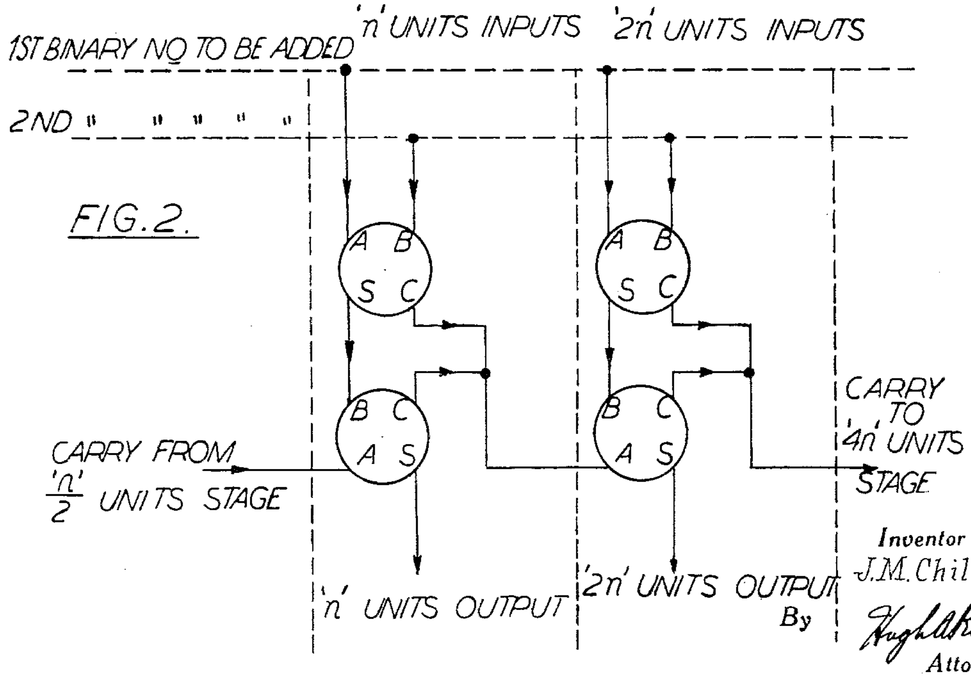
FIGURE 2 shows the connection of several half adder circuits to provide two complete binary adding stages.

The connection of a number of half adder circuits of the kind shown in FIGURE 1 to form two complete binary number adding stages is illustrated in FIGURE 2 from which it will be seen that two half-adders are required per stage. In each stage the upper half-adder produces "sum" or "carry" 1 output signals when 1 condition are present at either or both inputs respectively; the lower half-adder adds the "carry" signal, if any, from the next lower order stage. For the complete stage, three inputs are possible, i.e. a 1st binary number, a 2nd binary number and a "carry" signal from previous stage. Either half-adder, but not both, may produce a "carry" signal to the next stage. The "sum" signal for the stage, if any, appears at the "S" output of the lower half-adder.

In many cases the information is provided in number systems not of pure binary form. The commonest variant in use is the normal decimal or base 10 system, but in weighing, other systems such as for example base 20 or 28 are used. It is convenient to present the information from the scale, for example by projection of information from a disc-like reticule fast on the indicater spindle of the scale, in the form of a coded number. A well-known form of this presentation is the binary coded decimal system in which any number in a decade (or a digit) is represented by a combination of up to 4 digits in the binary series 1, 2, 4, 8. Thus for example the decimal digit 5 would be represented by the binary digits 1 and 4.

Figure 3:
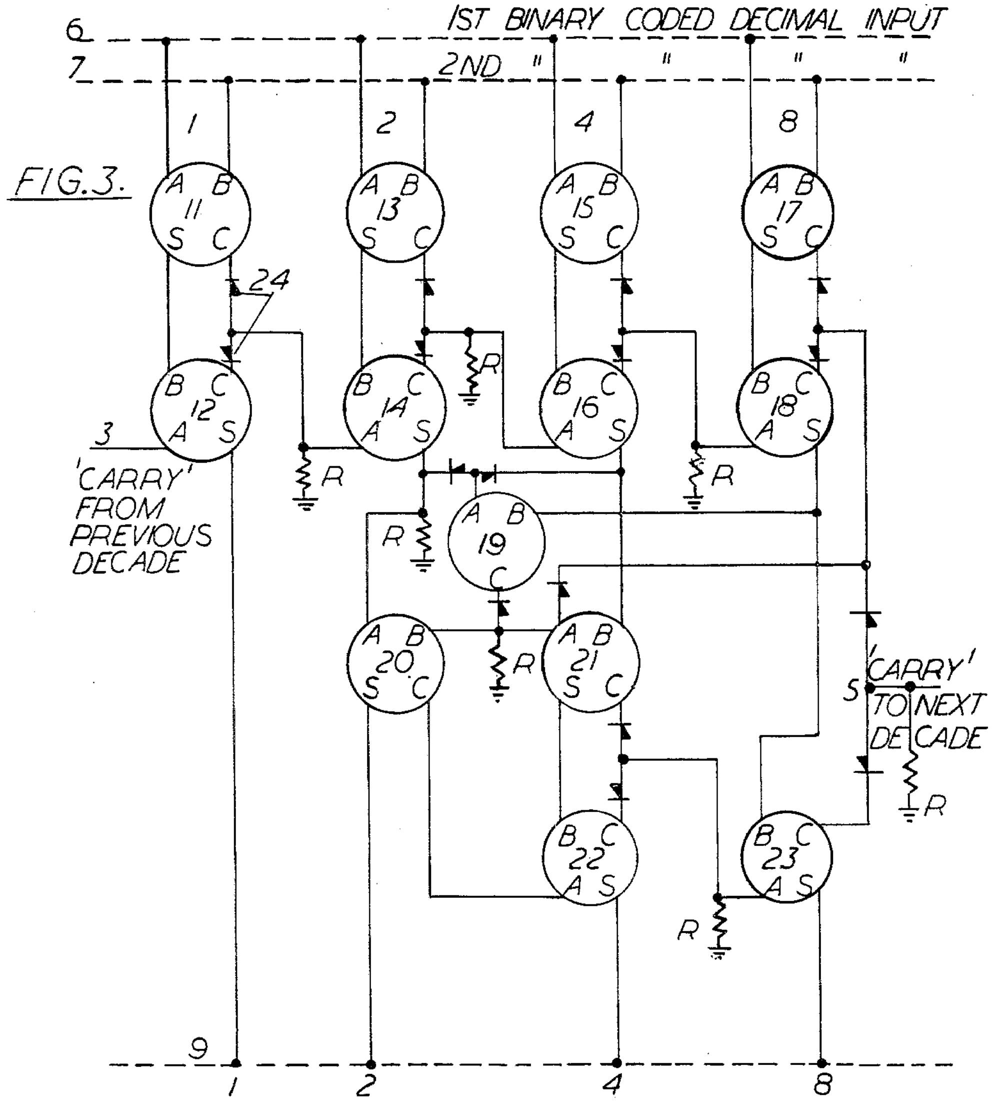
FIGURE 3 shows the combination of several half adder circuits to form a four stage binary digital counting system.

A four stage binary adder, with additional circuitry to add two decimal digits, is shown in FIGURE 3, the additional circuitry being required to obtain the "carry" from one decimal stage to the next at the correct value, i.e. when the sum is 10 or more.

The numbers 1, 2, 4, 8 represent the numerical values (or "weight") of the binary digits into which the decimal numbers are encoded. The two binary coded decimal inputs to be added are connected to the appropriate terminals of the two series of input connection 6 and 7 and their binary coded decimal sum is obtained from the series of output connections 9. Any "carry" signal from the previous stage is fed in at connection 3 and the ten-unit "carry" to a following stages is taken out at connection 5. Half wave rectifiers or diodes and resistors R are shown (as at 24) and are used when two output connections from units are coupled to the same input, to prevent direct electrical connection between the outputs which might affect the correct operation of the circuit. The method of connection of the diodes 24 in the circuit assumes that the signal representing the presence of digital unit, is a negative voltage such as would be obtained from the circuit in FIGURE 1.

Operation of the circuit shown in FIGURE 3 is as follows:

The half adder units 11, 12, 13, 14, 15, 16, 17, 18, form four complete binary adding stages which each operate as described in conjunction with FIGURE 2. When an output representing 10 units or more is obtained, signified by a simultaneous output from 14 or 16 and 18 (i.e. 2 or 4 plus 8) a "carry" signal is obtained at terminal C on unit 19. This feeds one input terminal of units 20 and 21 with their other terminals fed from the sum outputs S of units 14 and 16 respectively. This effectively adds 6 to the output from the basic binary adding circuit. Units 22 and 23 add in the carry signals, if any, in the 4 and 8 binary stages. If the sum of the inputs at terminals 6 and 7 is less than 10 units then the binary numbers representing the sum and appearing at the S terminals of 12, 14, 16 and 18 are fed through units 19, 20, 21, 22 and 23 to appear similarly at the output connections 9. If the sum of the inputs is 10 to 16 then 6 is added to the binary number from the basic adding circuit, a carry of 16 appears at 5 fed from output C on unit 23 and the remainder appears in binary form at 9. For example, if the sum of the inputs is 12 then 12+6=18 or a sum of 2 and a carry of 16. If the carry of 16 is taken as representing 10 to carry then the sum is the correct remainder.

If the sum of the inputs is between 16 and 18 (the maximum possible), for example 17, a 16 "carry" signal, representing 10 units, appears at output C on 17 or 18 and is fed to output 5. Also an input representing 6 is fed to the lower adding circuit comprising units 20, 21, 22, 23. This, together with the 1 output (17 minus 16) which appears directly at 9, gives the binary digits 1, 2 and 4 which correctly represent the decimal remainder or sum after the 16 carry signal, representing 10, has been taken from the original sum of 17.

Figure 4:
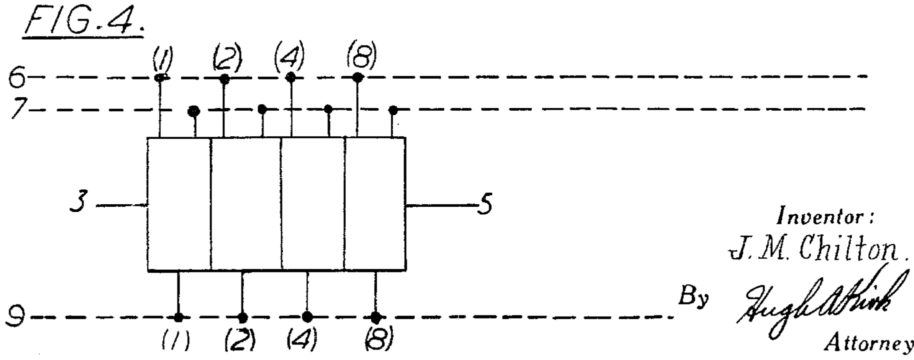
FIGURE 4 is a simplified representation of the circuit shown in FIGURE 3.

FIGURE 4 shows a simplified diagram of the above circuit.

In the circuit shown in FIGURE 3 instead of employing half adder circuits as shown in FIGURE 1, the third NOR circuit in each of a pair of half adder circuits may be omitted and the "carry" output taken from the output terminal of an EXCLUSIVE OR circuit having its two input terminals connected to their points D (FIG. 1) replacing the two diodes 24 and resistor R in FIGURE 3.

Using the above system, adding circuits may be designed to accommodate numbers with any base which may be required in weighing systems.

I claim:

1. A half adder circuit comprising an AND circuit and three NOR circuits each of which contains two input terminals and an output terminal; means connecting the input terminals of the AND circuit and the first NOR circuit in parallel; means connecting one of the input terminals of the second NOR circuit to the output terminal of the AND circuit and the other input terminal of said second NOR circuit to the output terminal of the first NOR circuit; means connecting the two input terminals of the third NOR circuit to the output terminals of the first and second NOR circuits, the output terminal of the second NOR circuit constituting the "sum" output terminal; and the output terminal of the third NOR circuit constituting the "carry" output terminal of the half adder circuit.

2. A half adder circuit as efined in claim 1 wherein each NOR circuit comprises: a transistor having a control terminal and a pair of current carrying terminals, a load resistor connected between a power supply terminal and one of said current carrying terminals whereby a junction between the last mentioned current carrying terminal and the load resistor constitutes the output terminal, and a pair of resistors connected together at one end to form a junction, means connecting said junction to said control terminal of the transistor, and means connecting the other end of each resistor to a different one of each of the two input terminals for said NOR circuit.

3. A binary number adding stage comprising a pair of half adder circuits each comprising an AND circuit and three NOR circuits each of which contains two input terminals and an output terminal; means connecting the input terminals of the AND circuit and the first NOR circuit in parallel; means connecting one of the input terminals of the second NOR circuit to the output terminal of the AND circuit and the other input terminal of said second NOR circuit to the output terminal of the first NOR circuit; means connecting the two input terminals of the third NOR circuit to the output terminals of the first and second NOR circuits, the output terminal of the second NOR circuit constituting the "sum" output terminal; and the output terminal of the third NOR circuit constituting the "carry" output terminal of the half adder circuit; means connecting the first and second input terminals of the first half adder circuit to receive signals representative of two binary numebrs to be added; means connecting the "sum" output terminal of the first half adder to one input terminal of the second half adder, means connecting the second input terminal of the second half adder to receive any "carry" signal from a lower order adding stage, whereby the two "carry" circuits provide any "carry" signal for any higher order stage, and the "sum" output terminal of the second half adder circuit provides any "sum" signal for the binary number adding stage.

4. A binary number adding stage as defined in claim 3 wherein each NOR circuit comprises: a transistor having a control terminal and a pair of current carrying terminals, a load resistor connected between a power supply terminal and one of said current carrying terminals whereby a junction between the last mentioned current carrying terminal and the load resistor constitutes the output terminal, and a pair of resistors connected together at one end to form a junction, means connecting said junction to said control terminal of the transistor, and means connecting the other end of each resistor to a different one of each of the two input terminals for said NOR circuit.

References Cited by the Examiner

UNITED STATES PATENTS 3,023,965 3/1962 Campbell ---------- 307—88.5

OTHER REFERENCES

Electronics World published June 1961, vol. 65, pages 52 and 53.

JOHN W. HUCKERT, *Primary Examiner.*

DAVID J. GALVIN, *Examiner.*